United States Patent [19]

Ohara et al.

[11] Patent Number: 5,430,120
[45] Date of Patent: Jul. 4, 1995

[54] MODIFIED SILICONE RELEASE AGENT

[75] Inventors: Shuzo Ohara, Kawanishi; Ryoichi Kitamura, Takaishi, both of Japan

[73] Assignee: GOYO Paper Working Co., Ltd., Osaka, Japan

[21] Appl. No.: 42,268

[22] Filed: Apr. 2, 1993

Related U.S. Application Data

[60] Continuation of Ser. No. 641,633, Jan. 17, 1991, Pat. No. 5,213,743, which is a continuation of Ser. No. 300,684, Jan. 19, 1989, abandoned, which is a division of Ser. No. 65,469, Jun. 23, 1987, abandoned.

[30] Foreign Application Priority Data

Jun. 24, 1986 [JP] Japan ................. 61-147734

[51] Int. Cl.⁶ .............................................. C08G 77/04
[52] U.S. Cl. ................................... 528/25; 528/31
[58] Field of Search ............................. 528/25, 15

[56] References Cited

U.S. PATENT DOCUMENTS

| | | | |
|---|---|---|---|
| 2,970,150 | 1/1961 | Bailey | 528/15 |
| 3,436,252 | 4/1969 | Neuruth | 528/15 |
| 3,450,736 | 6/1969 | DeMonterey | 528/15 |
| 4,702,874 | 10/1987 | Ohara et al. | 264/171 |

*Primary Examiner*—Ralph H. Dean
*Attorney, Agent, or Firm*—Armstrong, Westerman, Hattori, McLeland & Naughton

[57] ABSTRACT

The present invention provides a release agent formed by reacting an organopolysiloxane compound having at least one hydrogen atom with a hydrocarbon compound having at least one double bond which reacts with said hydrogen atom and a manufacturing method thereof. The release agent of this invention, which makes substantially no migration into any pressure sensitive adhesive layer, is well adaptable to whichever process, extrusion laminating process or coating process.

4 Claims, No Drawings

MODIFIED SILICONE RELEASE AGENT

This application is a continuation of application Ser. No. 07/641,633, filed Jan. 17, 1991, now U.S. Pat. No. 5,213,743 which in turn is a continuation of application Ser. No. 07/300,684, filed Jan. 19, 1989 and now abandoned, which in turn is a division of application Ser. No. 07/065,469, filed Jun. 23, 1987 and now abandoned.

BACKGROUND OF THE INVENTION

1. Field of the Invention

The present invention relates to a novel release agent and a manufacturing method of a release paper with use thereof and more particularly, pertains to a novel release agent which is substantially free of migration into the layer of any pressure sensitive adhesive and a method of efficiently and economically manufacturing release paper with use thereof by way of extrusion lamination or coating process.

2. Description of the Prior Art

Heretofore, the manufacturing method of silicone base release paper is principally based on a coating process, in which usually, a layer of laminated polyethylene is formed on a substrate like paper, etc., and further, a release layer is coated on the surface thereof. The release agent employed in this process consists of polymethyl hydrogen siloxane and vinyl group containing polydimethyl siloxane, and addition of platinum catalyzer and heat induces their addition reaction, causing curing and formation of release coating. According to this process, however, it thus needs to be prepared by mixing the ingredients and subjecting the mixture to the addition reaction. This process involves not only problems in insufficient curing, short pot life, etc., but difficulties in practical uses because of complicated operation and handling.

On the other hand, the release layer may be formed on the substrate at once by extrusion lamination process. The resin laminated in this way itself has a certain releasability. As such releasable resins, ethylene-α-olefin copolymer elastomer, etc., are used and they are preferable for acrylic pressure sensitive adhesives. In the aforementioned extrusion lamination process, however, there is apprehension regarding heat and solvent resistance, etc., at the time of coating of acrylic pressure sensitive adhesives and scattering of release potential with regard to the acrylic pressure sensitive adhesives and the release strength becomes heavier with the lapse time. Since ethylene-α-olefin copolymer elastomer, when singly used, is difficult to extrude, it is used in mixture with polyethylene. The smaller the mixing proportion of said elastomer, the more releasing effect will be lost; but conversely, with its increasing proportions, said elastomer's property will become stronger, and the film strength lower; moreover, such problems in processing as blocking, etc., will be induced.

And in Patent Publication No. Sho 60-5628, a releasable laminate film formed by laminating on a substrate a thermoplastic resin prepared with addition of non-cure type organopolysiloxane is proposed. But such a releasable laminate film shows high resistance to release and produces bleeding to the surface of silicone even at room temperature; therefore, it can not necessarily be said adequate for pressure sensitive adhesive tapes or sheets.

The present inventors, in an effort to overcome such problems hereabove-mentioned, developed a manufacturing method of a release agent which comprises extruding a mixture of a silicone base release agent and polyolefin and, then, getting said release agent bled to the surface by subjecting it to a heat-treatment, followed by fixing by curing, and earlier, they filed an application for the patent on this method (U.S. Ser. No. 835,854, filed Feb. 26, 1986, U.S. Pat. No. 4,702,874). Said method, however, is disadvantageous in that it requires a curing treatment by treatment with such a catalyzer as chloroplatinic acid, etc.

SUMMARY OF THE INVENTION

This invention has been intended to solve the problems of prior art as hereabove-mentioned. Its object is to provide a release agent which makes substantially no migration into the pressure sensitive adhesive layer and which is suitable for whichever process, extrusion lamination process or coating process.

Other objects and advantages of this invention will become clearer from the following detailed description.

DETAILED DESCRIPTION OF THE INVENTION

Thus a first aspect of this invention resides in a release agent formed by reacting an organopolysiloxane compound having at least one hydrogen atom with a hydrocarbon compound having at least one double bond which reacts with said hydrogen atom; a second aspect of this invention, a manufacturing method of a release paper characterized in that on a substrate of paper, cloth, film, etc., there is extruded a mixture of a polyolefin and a release agent produced by reacting an organopolysiloxane compound having at least one hydrogen atom with a hydrocarbon compound having at least one double bond which reacts with said hydrogen atom, thereby forming a laminate, and that the release agent contained in the mixture layer of the aforementioned laminate is localized by letting it bled to the surface of said mixture layer; and a third aspect of this invention, that on a polyolefin film of a substrate having such a film, there is coated a solution having dissolved therein a release agent formed by reacting an organopolysiloxane compound having at least one hydrogen atom with a hydrocarbon compound having at least one double bond which reacts with said hydrogen atom.

Thus the release agent of this invention may be obtained by reacting an organopolysiloxane compound having at least one hydrogen atom with a hydrocarbon compound having at least one double bond which reacts with said hydrogen atom.

As the organopolysiloxane compounds having at least one hydrogen atom, there may be mentioned polymethyl hydrogen siloxane, polymethyl hydro-dimethyl siloxane copolymer, etc.

As the hydrocarbon compounds having at least one double bond which reacts with the hydrogen atom of the aforementioned organopolysiloxane compounds, there may be mentioned α-olefin, polyethylene wax, 1,4-polybutadiene, 1,2-polybutadiene, polybutene, 9-octadecene, etc., and their mixtures.

Illustrating a manufacturing method of the release agent, polymethyl hydrogen siloxane (including polymethyl hydro-dimethyl siloxane copolymer) and α-olefin or macromer having a vinyl group at its terminal are mixed and the mixture is subjected to addition reaction by warming, with chloroplatinic acid added as the catalyzer. The reaction product obtained is refined by cleaning several times with acetone, etc., followed by drying.

In manufacturing a release paper by way of extrusion using the release agent synthesized as hereabove-described, although impossible to comprehensibly specify on account of effect of varying silicon contents, the amount of said release agent to be mixed should be approx. 1–10% by weight in proportion to polyolefin, or more preferably, 2–5% by weight, when its silicon content is 50%. The mixture is kneaded and pelletized by a pelletizer, to be used as a mixture layer resin (extrusion resin). Master batch operation using a twin-screw extruder is also feasible. This material may be also effectively utilized as a release agent for a variety of pressure sensitive adhesives or hard urethane foam, etc., or for medicines or as a poultice separator, by adjusting its amount added.

As polyolefin used according to this invention, preferable are polyethylene, polypropylene, 4-methyl pentene-1 resin and copolymers with ethylene such as ethylene-propylene copolymer, ethylene-vinyl acetate copolymer, ethylene-acrylic acid copolymer, etc., and their mixtures, etc. Of the polyethylene, linear low density polyethylene having densities of 0.910–0.935 g/cm$^3$ are especially excellent in low speed range peeling and are advantageous in that they may be heat-treated in a short period of time, because they permit high temperature heat treatment. Besides, in order to positively promote localization of bleeding, tackifiers or polyvinyl ether, etc., from which plasticizer effect for polyolefin may be expected may be added. And by adding calcium carbonate, titanium dioxide, talc, kaolin, powder silica, zeolite, etc., releasability may be controlled, or pressure sensitive adhesive tapes which permit lap joint may be achieved. Furthermore, through joint use of embossing process, the releasability may be controlled.

The release layer resin obtained in this way is extruded on a substrate by use of an extrusion laminator, thereby forming a release layer on the substrate. Substrate forms used according to this invention include paper, cloth, film, metal foil and their laminates, etc.

When laminated on the substrate, the release agent is bled and localized to the surface of the mixture layer of the release layer, simultaneously as it is extruded, on account of the heat produced at the time of extrusion lamination. But if the localization is inadequate, the laminate should be heat-treated. Due to the heat evolved at the time of extrusion lamination or by the reheat-treatment the release agent contained in the mixture layer is bled to the surface of the mixture layer, to be localized; as a result, similar state will be brought about as that obtained by coating some release agent on the surface of polyethylene layer as in a conventional method.

According to this invention, it is allowed to interpose an adhesion enhancing layer of polyethylene, etc., between the release layer and the substrate for improvement in adhesion therebetween.

On the other hand, for manufacturing the release paper by the coating process using the release agent of this invention, the hitherto well-known method is usable. Thus the release agent of this invention is dissolved in such a solvent as toluene, etc., to have its 1–5% solution, and this solution is coated on a polyolefin film, followed by drying. The coating may be subjected to heat treatment, as required. The amount of the agent to be coated may be in the normal range, e.g., the range of 1.5 g/m$^2$–0.6 g/m$^2$.

The release agent of this invention will provide affinity to non-solvent silicone, particularly when blended into polyolefin laminate layer of the non-solvent silicone coating substrate, and on this account, it is finding preferable applications in curtailment of spots, pinholes, etc., when it is coated, in improvement in control on the accuracy of the coating amount and further, in manufacture of high quality release papers.

The feature of the present invention is to provide a release agent obtained by reacting an organopolysiloxane compound having at least one hydrogen atom with a hydrocarbon compound having at least one double bond which reacts with said hydrocarbon atom, i.e., a release agent comprising a so-called comb-form copolymer obtained by grafting chains of hydrocarbon compounds onto an organopolysiloxane compound as a main chain.

In a mixture of the release agent of the comb-form copolymer and a polyolefin, the organopolysiloxane compound main chain is localized and oriented to the surface of the polyolefin, i.e., the air side. This has already been confirmed by ATR-IR analytical results. On the other hand, the chains (graft branches) of the hydrocarbons have high compatibility with the polyolefin, so that sometimes they produce chemical bonds, thereby exhibiting anchoring effect as if they extend their roots in the polyolefin. Thus the organopolysiloxane compound main chain is brought into a state of being firmly fastened to the surface of the polyolefin, substantially foreclosing its migration into the pressure sensitive adhesive layer.

In the following, this invention will be described in connection with examples and comparative examples, but obviously its claim coverage is not limited to these modes only. In the following, parts and % are respectively meant to represent values by weight, unless otherwise specified.

EXAMPLE 1

Into a reactor, 45.6 parts of polymethyl hydrogen siloxane (P=300, $\overline{MW}$=22,000), 54.4 parts of α-olefin ("DIALEN-30", manufactured by Mitsubishi Kasei Kogyo, (Chemical Industry)) and 8 parts of 0.1% H$_2$PtCl$_6$.6H$_2$O tetrahydrofuran solution were charged, to undergo addition reaction at 80° C. for 8 hr and, then, to be further reacted at 130° C. for 18 hr. The reaction was stopped when the viscosity of the reaction product reached approx. 10,000 cps. The reaction product was cleaned thrice with acetone, to remove unreacted part, for its refinement, followed by drying. The silicon content of the release agent obtained in this way was 45.6%.

EXAMPLE 2

Three percent of the release agent obtained in Example 1 in proportion to low density polyethylene ("M-10P", manufactured by Mitsui Sekiyu Kagaku MI: 9.5, density: 0.917 g/cm$^3$) was added thereto, to prepare pellets for mixture layer at a dies temperature of approx. 200° C. by use of a pelletizer. The low density polyethylene as used for the mixture layer was separately prepared as an adhesion enhancing layer.

As the substrate, 73 g/m$^2$ of CLUPAK unbleached kraft was used; polyethylene for adhesion enhancing layer was extruded at a dies temperature of 300° C. by use of a conventional co-extrusion laminator and the pellets for mixture layer was simultaneously extruded at a dies temperature of 260° C., thereby yielding a laminate of a three layer structure of substrate layer-adhesion enhancing layer-mixture layer. The thickness of the mixture layer obtained was 15 μm, and the thickness of the adhesion enhancing layer 15 μm.

Then a sheet form was cut from the three layer laminate obtained in this way and was subjected to a heat treatment at 120° C. for 20 min, with the release layer surface turned upward.

With the release paper thus obtained, the release potential and the residual adhesive strength were measured by the undermentioned method. The results are put up in Table 1.

Pressure sensitive adhesive tape:
An acrylic pressure sensitive adhesive kraft tape ("ELM TAPE" manufactured by Soken Kako) was prepared to be 25 mm width×210 mm length, for it to be used in the tests.

Measuring conditions:
The aforementioned pressure sensitive adhesive tape was stuck with the aforementioned release paper by reciprocally applying pressure by an application device with a 4.5 kg dead weight at a speed of 5 mm/sec and the release potential and the residual adhesive strength of the product were measured under the following conditions:

The measurements were taken after the paper and the tape stuck together had been subjected to ageing by leaving for 20 hr under weight of 20 g/cm$^2$ applied thereon in an atmosphere of temperature 70° C. and humidity 65% RH and, then, left cooling.

Measuring method:
The measurements were taken at a peeling angle of 180 degrees, using an autograph tensile tester ("STROGRAPH-R", manufactured by Toyo Seiki), for the low speed range (0.3 m/min) peeling, and a high speed peeling tester (manufactured by Tester Sangyo), for the high speed range (3 m/min and 20 m/min). The condition at the time of measurements were 23° C. and 65% RH.

EXAMPLE 3

In manufacturing the similar laminate as in Example 2, the extrusion was made under the same conditions as in Example 2, except that a cooling roll which was coated with tetrafluoroethylene-hexafluoroprorylene copolymer was used at the time of making extrusion lamination.

The release paper obtained was put to the similar tests as in Example 2. The results are given in Table 1. The localization of the release agent was adequate. By coating the cooling roll with the foregoing copolymer, the surface of the roll is made non-polar, which accelerates the localization of the release agent.

EXAMPLE 4

The release agent obtained in Example 1 was dissolved in toluene to have its 3% solution, which was heated to 40° C. and coated on a biaxial orientation polypropylene film (OPP) (50 um). Its amount applied was 0.7 g/m$^2$. The release paper thus obtained was put to the similar tests as in Example 2. The results are shown in Table 1.

Comparative Example 1

Use was made of only the low density polyethylene "M-10P" used in Example 2, which was extruded just as in Example 2 and the release potential and the residual adhesive strength of the product were measured. The results are given in Table 1.

Comparative Example 2

The release paper obtained in Comparative example 1 was subjected to a heat treatment at 120° C. for 20 min and the release potential and the residual adhesive strength of the treated product were masured. The results are listed in Table 1.

Comparative Example 3

A release paper was obtained similarly as in Example 2, except that the localization was inadequate and that it was not subjected to the heat treatment, and its release potential and residual adhesive strength were measured. The results are presented in Table 1.

TABLE 1

|  | Localization | Release Potential (1) Peeling rate | | | Residual adhesive strength (2) |
| --- | --- | --- | --- | --- | --- |
|  |  | 0.3 m/min | 3 m/min | 20 m/min | (0.3 m/min) (%) |
| Example 2 | 120° C. × 20 min | 50 | 95 | 110 | 98.3 |
| Example 3 | Made at the time of making lamination. | 45 | 90 | 115 | 97.8 |
| Example 4 | — | 50 | 75 | 85 | 92.1 |
| Comparative example 1 | — | 390 | 600 | 520 | 65.3 |
| Comparative example 2 | 120° C. × 20 min | 360 | 520 | 470 | 73.5 |
| Comparative example 3 | — | 170 | 270 | 290 | 75.0 |

(1) The unit for the measured values is g/25 mm in all cases.

(2) Residual adhesive strength (%) = $\frac{\text{Adhesive strength of standard pressure sensitive adhesive tape after stuck on the surface of release paper}}{\text{adhesive strength of standard pressure sensitive adhesive tape before stuck on the surface of release paper}} \times 100$ As hereabove described, the release agent of this invention does not bleed at room temperature and gives excellent release potential and residual adhesive strength. And when manufacturing a release paper by the extrusion lamination process, using the release agent of this invention, curing treatment is not required and when coating process is used, its mere dissolution in a solvent will do without the need of preparation by mixing and making addition reaction, every time coating is done; accordingly, productivity is greatly elevated.

What is claimed is:

1. A modified silicone compound formed by reacting an organopolysiloxane having a number average molecular weight of 22,000 and at least one hydrogen atom with an α-olefin.

2. A modified silicone compound according to claim 1, wherein the α-olefin is a macromer having at least one vinyl group at its terminal.

3. A release agent compound formed by reacting an organopolysiloxane having a number average molecular weight of 22,000 and at least one hydrogen atom with an α-olefin.

4. A release agent compound according to claim 3, wherein the α-olefin is a macromer having at least one vinyl group at its terminal.

* * * * *